US011538465B1

(12) United States Patent
Badary

(10) Patent No.: US 11,538,465 B1
(45) Date of Patent: Dec. 27, 2022

(54) SYSTEMS AND METHODS TO FACILITATE INTENT DETERMINATION OF A COMMAND BY GROUPING TERMS BASED ON CONTEXT

(71) Applicant: Suki AI, Inc., Redwood City, CA (US)

(72) Inventor: Ahmad Badary, Calgary (CA)

(73) Assignee: Suki AI, Inc., Redwood City, CA (US)

( * ) Notice: Subject to any disclaimer, the term of this patent is extended or adjusted under 35 U.S.C. 154(b) by 397 days.

(21) Appl. No.: 16/678,453

(22) Filed: Nov. 8, 2019

(51) Int. Cl.
| | | |
|---|---|---|
| *G10L 15/18* | (2013.01) | |
| *G06N 20/00* | (2019.01) | |
| *G06N 7/00* | (2006.01) | |
| *G10L 15/22* | (2006.01) | |
| *G06F 40/30* | (2020.01) | |
| *G06F 40/211* | (2020.01) | |

(52) U.S. Cl.
CPC ........ *G10L 15/1815* (2013.01); *G06F 40/211* (2020.01); *G06F 40/30* (2020.01); *G06N 7/005* (2013.01); *G06N 20/00* (2019.01); *G10L 15/22* (2013.01); *G10L 2015/223* (2013.01)

(58) Field of Classification Search
CPC ................. G10L 15/1815; G10L 15/22; G10L 2015/223; G06N 7/005; G06N 20/00; G06F 40/211; G06F 40/30
See application file for complete search history.

(56) References Cited

U.S. PATENT DOCUMENTS

| | | | | |
|---|---|---|---|---|
| 5,857,179 | A | * | 1/1999 | Vaithyanathan ...... G06F 16/355 |
| 7,124,081 | B1 | * | 10/2006 | Bellegarda .......... G10L 15/1815 |
| | | | | 704/255 |
| 9,589,578 | B1 | | 3/2017 | Dippenaar |
| 10,083,169 | B1 | * | 9/2018 | Ghosh ..................... G06F 40/35 |
| 10,629,193 | B2 | | 4/2020 | Ye |
| 10,755,177 | B1 | * | 8/2020 | Dabney ................. G06N 5/022 |
| 10,978,189 | B2 | | 4/2021 | White |

(Continued)

FOREIGN PATENT DOCUMENTS

| | | | | | |
|---|---|---|---|---|---|
| CN | 102081602 | A | * | 6/2011 | ......... G06F 17/2735 |
| CN | 107515877 | B | * | 7/2021 | ......... G06F 16/3325 |

OTHER PUBLICATIONS

Specification of U.S. Appl. No. 62/914,669, filed Oct. 14, 2019 (Year: 2019).*

(Continued)

*Primary Examiner* — Eric Yen
(74) *Attorney, Agent, or Firm* — Esplin & Associates, PC

(57) ABSTRACT

Systems and methods to group terms based on context to facilitate determining intent of a command are disclosed. Exemplary implementations to train a model: obtain a set of writings within a particular knowledge domain; obtain a vector generation model that generates vectors for individual instances of the terms in the set of writings; generate a first set of vectors that represent the instances of a first term and other vectors that represent instances of the other terms of the set of writings; train the vector generation model to group the vectors of a similar context in a space of a vector space; obtain a transcript include a new term generated from user audio dictation; generate a new vector that represent the instance of the new term; obtain the space; compare the new vector with the space; utilize the new term as the first term.

20 Claims, 6 Drawing Sheets

(56) References Cited

U.S. PATENT DOCUMENTS

| | | | |
|---|---|---|---|
| 2002/0111789 A1* | 8/2002 | Hull | G06F 40/44 704/4 |
| 2003/0204400 A1* | 10/2003 | Marcu | G06F 40/242 704/251 |
| 2004/0054533 A1* | 3/2004 | Bellegarda | G10L 15/187 704/254 |
| 2005/0049852 A1* | 3/2005 | Chao | G06F 40/30 704/9 |
| 2007/0033218 A1* | 2/2007 | Taylor | G06F 16/9535 |
| 2009/0063546 A1* | 3/2009 | Sullivan | G06F 40/242 |
| 2009/0248678 A1* | 10/2009 | Okamoto | G06F 16/355 |
| 2010/0217598 A1* | 8/2010 | Adachi | G10L 15/22 704/254 |
| 2012/0330975 A1* | 12/2012 | Lee | G06F 16/337 707/749 |
| 2013/0041857 A1* | 2/2013 | Medlock | G06F 40/274 706/14 |
| 2013/0110496 A1* | 5/2013 | Heidasch | G06F 40/247 704/9 |
| 2015/0006157 A1* | 1/2015 | Andrade Silva | G06F 40/247 704/9 |
| 2015/0189086 A1* | 7/2015 | Romano | H04M 3/42221 379/265.09 |
| 2015/0279358 A1* | 10/2015 | Kingsbury | G10L 15/083 704/257 |
| 2017/0011289 A1* | 1/2017 | Gao | G06F 40/268 |
| 2017/0147910 A1* | 5/2017 | Mao | G06N 3/0445 |
| 2017/0286397 A1* | 10/2017 | Gonzalez | G06F 40/35 |
| 2017/0344530 A1* | 11/2017 | Krasadakis | G06F 40/47 |
| 2017/0351781 A1* | 12/2017 | Alexander | G06N 3/08 |
| 2018/0032874 A1* | 2/2018 | Sánchez | G06F 16/367 |
| 2018/0130019 A1* | 5/2018 | Kolb | G06F 16/9024 |
| 2018/0137855 A1* | 5/2018 | Lee | G10L 15/063 |
| 2018/0157640 A1* | 6/2018 | Chung | G06F 40/56 |
| 2018/0157646 A1* | 6/2018 | Yang | G06F 40/151 |
| 2018/0285448 A1* | 10/2018 | Chia | G06N 5/04 |
| 2018/0308487 A1* | 10/2018 | Goel | G10L 15/26 |
| 2019/0043506 A1 | 2/2019 | Rivkin | |
| 2019/0057143 A1* | 2/2019 | Porter | G06Q 10/10 |
| 2019/0065505 A1* | 2/2019 | Fukuda | G06F 16/243 |
| 2019/0139551 A1 | 5/2019 | Steelberg | |
| 2019/0154439 A1 | 5/2019 | Binder | |
| 2019/0197399 A1* | 6/2019 | Zhang | G06N 3/08 |
| 2019/0213601 A1* | 7/2019 | Hackman | G06N 3/084 |
| 2019/0266070 A1* | 8/2019 | Bhandarkar | G06F 11/3644 |
| 2019/0294678 A1* | 9/2019 | Sapugay | G06N 20/00 |
| 2019/0385610 A1 | 12/2019 | Steelberg | |
| 2020/0074242 A1* | 3/2020 | Chen | G06Q 30/0601 |
| 2020/0234009 A1* | 7/2020 | Uchide | G06F 16/3347 |
| 2020/0285910 A1 | 9/2020 | Steelberg | |
| 2020/0286485 A1 | 9/2020 | Steelberg | |
| 2020/0372215 A1* | 11/2020 | Uchida | G06F 40/35 |
| 2020/0394620 A1* | 12/2020 | Kim | G06Q 20/02 |
| 2021/0056168 A1* | 2/2021 | Bull | G06F 40/211 |
| 2021/0109958 A1* | 4/2021 | Behtash | G06K 9/6256 |

OTHER PUBLICATIONS

G. Xun, X. Jia, V. Gopalakrishnan and A. Zhang, "A Survey on Context Learning,", Jan. 1, 2017, in IEEE Transactions on Knowledge and Data Engineering, vol. 29, No. 1, pp. 38-56, doi: 10.1109/TKDE.2016.2614508 (Year: 2017).*

P. Hui and H. Meng, "Latent Semantic Analysis for Multimodal User Input With Speech and Gestures,", Feb. 2014, in IEEE/ACM Transactions on Audio, Speech, and Language Processing, vol. 22, No. 2, pp. 417-429, doi: 10.1109/TASLP.2013.2294586 (Year: 2014).*

Glasz, C., "Hybrid recommendation to low-engagement users", 2019 Available from ProQuest Dissertations and Theses Professional. Retrieved from https://dialog.proquest.com/professional/docview/2472040446?accountid=131444 (Year: 2019).*

Google Translation of CN 107515877B, https://patents.google.com/patent/CN107515877B/en?oq=CN107515877B (Year: 2021).*

Google Translation of CN 102081602A, https://patents.google.com/patent/CN102081602A/en?oq=CN102081602A (Year: 2011).*

* cited by examiner

SYSTEMS AND METHODS TO FACILITATE INTENT DETERMINATION OF A COMMAND BY GROUPING TERMS BASED ON CONTEXT

FIELD OF THE DISCLOSURE

The present disclosure relates to systems and methods to group terms based on context to facilitate determining intent of a dictated command.

BACKGROUND

Personnel and other professionals of various industries may utilize speech recognition platforms to dictate, transcribe, and generate notes and/or commands. The generated note and/or commands may be further processed to determine the commands. In some instances, the command may contain terms the processor has not encountered before and therefore is uncertain of the intent.

SUMMARY

One aspect of the present disclosure includes determining the intent of a command that includes a term a system has not encountered before. The system may obtain a transcript representing audio dictation of a user that includes the unknown term. The system may communicate with a model trained to group terms of the same context. The model may generate a set of vectors that numerically represent the unknown term and other terms of the transcript. The model may compare the set of vectors with a space of a vector space that is of the same context as the transcript. Upon comparison, it may be determined the set of vectors correlates to the space and to a known vector of the space. Thus, utilizing text represented by the known vector in lieu of the unknown term may clarify the intent of the command.

Another aspect of the present disclosure includes training the model the system communicated with. Training the model includes obtain a set of writings of a knowledge domain that include various terms, including the known term. Vectors for each of the various terms may be generated to numerically represent the individual term and its context. The vectors generated may be grouped in the space of the vector space based on similar context.

One aspect of the present disclosure relates to a system configured to utilize a term grouping model to determine intent of a command with a new spoken term. The term grouping model may be configured to group terms based on a particular context. The system may include one or more hardware processors configured by machine-readable instructions. Machine-readable instructions may include one or more instruction components. The instruction components may include one or more of obtaining component, employ component, utilize component, and/or other components.

Obtaining component may be configured to obtain a transcript automatically generated from audio dictation of a user. The transcript may result from automatic speech recognition and include instances of transcribed terms automatically derived from the audio dictation as textual representations of spoken terms in the audio dictation. The transcribed terms may include an instance of a new transcribed term.

Obtaining component may be configured to facilitate communication with the term grouping model.

Employ component may be configured to employ a model trained by the term grouping model. The trained model may generate a primary set of vectors that numerically represents the text of the transcribed terms of the transcript and context of the instances of the transcribed terms of the transcript. The primary set of vectors may include a primary vector to represent the text of the new transcribed term and context of the instance of the new transcribed term.

Employ component may be configured to obtain a first space in the vector space. The first space in the vector space may represent text of transcribed terms of the same context of the instances of the transcribed terms of the transcript. The first space may include the primary set of vectors, except the primary vector, and may include a first vector that represents text of an alternative term of the context of the instances of the transcribed terms of the transcript.

Utilize component may be configured to compare the primary set of vectors to the vectors of the first space. Comparison may determine the primary vector correlates to the first space. Such comparison indicates the primary vector and the first vector in the first space are equivalent. Utilize component may be configured to store the correlation between the primary vector and the first vector.

Utilize component may be configured to utilize the text of the alternative term in the instance of the new transcribed term. The utilization of the text of the alternative term that is represented by the first vector does not change the implication of transcript because the primary vector and the first vector in the first space are equivalent.

Another aspect of the present disclosure relates to a system configured to group terms based on context (i.e., the term grouping model). The system may include one or more hardware processors configured by machine-readable instructions. Machine-readable instructions may include one or more instruction components. The instruction components may include one or more of obtaining component, vector generation model, training component, and/or other instruction components. Such system (i.e., the term grouping model) may be configured to train a model to group terms based on context prior to a system utilizing of the model (e.g., the system described above).

A distinct obtaining component may be configured to obtain a set of writings within a particular knowledge domain. The individual writings may include terms. The terms may include transcribed terms automatically derived from audio dictations representing various speech from a user that resulted from automatic speech recognition as textual representations of spoken terms in the audio dictations and/or published terms of literatures of the particular knowledge domain. The terms may include instances of a first term that is part of a lexicography of the knowledge domain.

Training component may be configured to obtain a vector generation model that generates vectors for individual instances of the terms in the set of writings that are part of a lexicography of the knowledge domain. The vectors numerically may represent the text of the terms and contexts of the instances of the terms. The contexts of the instances of the terms may include the other terms in the individual writings and/or syntactic relationship with the instances of the terms.

The training component may be configured to use the vector generation model to generate a first set of vectors are generated that represent the instances of the first term. Such vectors numerically represent the text of the first term and different contexts of the individual instances of the first term. The first set of vectors may include a first vector that numerically represents the text of the first term and the context of a first instance of the first term.

The training component may be configured to use the vector generation model to generate other vectors are generated that represent instances of the other terms of the set of writings. Such vectors may numerically represent the text of the individual other terms and different contexts of the individual instances of the individual other terms.

The training component may be configured to train the vector generation model to group the vectors of a similar context in a space of a vector space. Such training may cause the first vector and the other vectors are grouped in the first space of the vector space.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
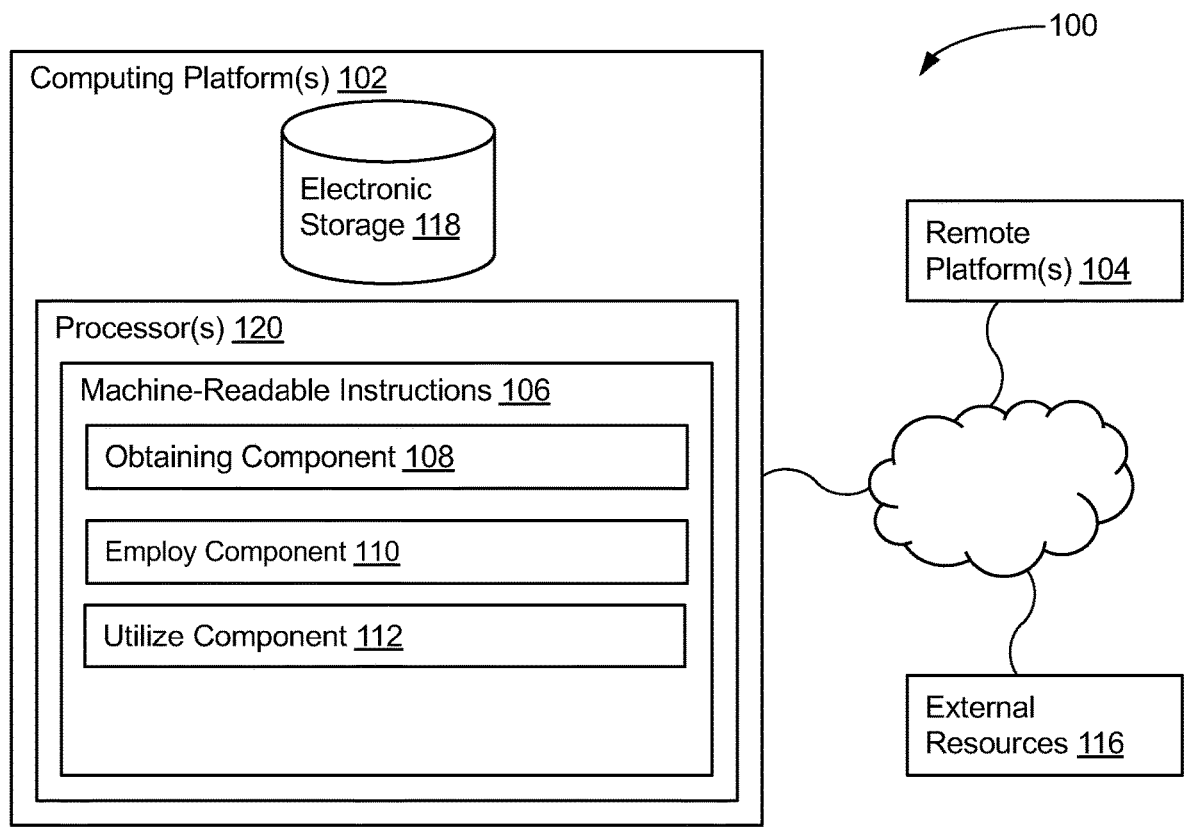
FIG. 1 illustrates a system configured to utilize a term grouping model to determine intent of a command with a new spoken term, in accordance with one or more implementations.

FIG. 1 illustrates a system 100 configured to utilize a term grouping model to determine intent of a command with a new spoken term, in accordance with one or more implementations. The term group model may be the same as or similar to system 200, in accordance with one or more implementations.

In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of obtaining component 108, employ component 110, utilize component 112, and/or other components.

Obtaining component 108 may be configured to obtain a transcript automatically generated from audio dictation of a user. The transcript may result from automatic speech recognition. The transcript may include instances of transcribed terms automatically derived from the audio dictation as textual representations of spoken terms in the audio dictation. The transcribed terms may include an instance of a new transcribed term.

Figure 4A:
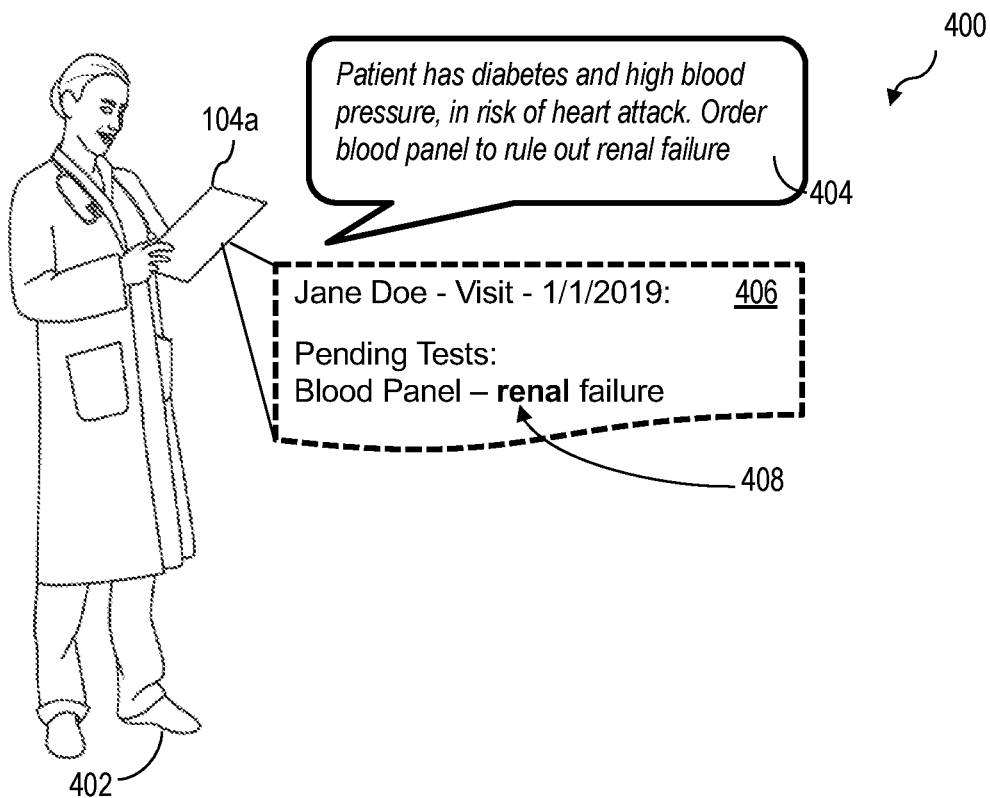
FIG. 4A-D illustrates an example implementation of systems described herein, in accordance with one or more implementations.

FIG. 4A-D illustrates an example implementation of system 100 and system 200 described herein, in accordance with one or more implementations. FIG. 4A may illustrate scenario 400 including recording information after an appointment and interfaces presenting the information. Scenario 400 may include doctor 402 (i.e., recording user). Doctor 402 may dictate audio 404 into mobile tablet 104a. Based on audio 404, transcript 406 may be generated including unidentified term 408 system 100 has not encountered before and must determine the intent.

Referring back to FIG. 1, obtaining component 108 may be configured to facilitate communication with system 200 (i.e., the term grouping model). System 200 may train a model to group terms based on a particular context. Regarding the example implementation of FIG. 4-D, the particular context may be kidneys and terms related to kidneys. Communication with system 200 may be via thumb drive, communication over a network, and/or other modes of communication.

Figure 2:
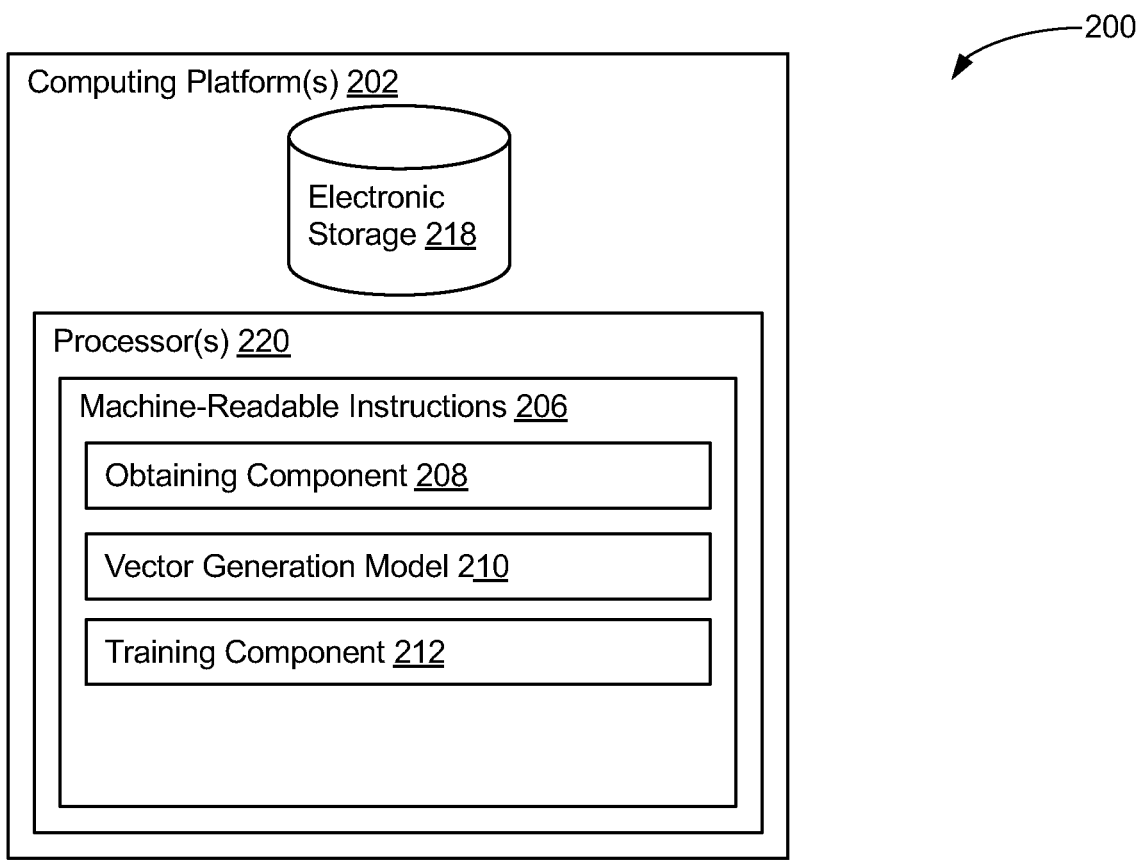
FIG. 2 illustrates a system configured to group terms based on context, in accordance with one or more implementations.

FIG. 2 illustrates a system 200 configured to group terms based on context, in accordance with one or more implementations. In some implementations, system 200 may include one or more servers 202.

Server(s) 202 may be configured by machine-readable instructions 206. Machine-readable instructions 206 may include one or more instruction components. The instruction components may include computer program components. The instruction components may include one or more of obtaining component 208, vector generation model 210, training component 212, and/or other instruction components.

Obtaining component 208 may be configured to obtain a set of writings within a particular knowledge domain. By way of non-limiting example, the set of writings may include transcripts of notes of the user (e.g., notes derived from audio dictations of the users), books (e.g., medical textbooks, auto manuals), theses, articles (e.g., research articles, clinical trial reports, case reports, review articles, etc.), transcribed lectures, and/or other writings. Transcripts of notes of the user may facilitate tailoring the model for the user. By way of non-limiting example, the particular knowledge domain may include medical field, automotive field, law and law enforcement, civil engineering, and/or other knowledge domains. In some implementations, the particular knowledge domain may be a narrowed focus of the particular knowledge domain. By way of non-limiting example, a narrowed focus of the medical field knowledge domain may include a narrowed focus on the kidney organs.

The individual writings may include terms. The terms may include words and/or phrases. The terms may include transcribed terms, published terms of literatures of the particular knowledge domain, and/or others. The transcribed terms may be automatically derived from audio dictations representing various speech from the user. The transcribed terms may result from automatic speech recognition as textual representations of spoken terms in the audio dictations. The published terms may be recognized from literature (e.g., research article). The terms may include instances of a first term that is part of a lexicography of the knowledge domain.

Figure 4B:
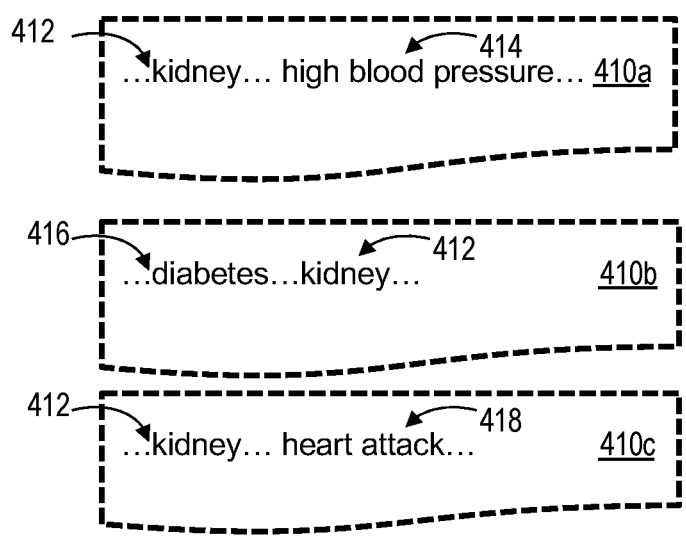

Referring to FIG. 4B, writing 410a, writing 410b, and writing 410c may be obtained and include term 412 (i.e., instances of the first term), "kidney". Writing 410a may include term 414, writing 410b may include term 416, and writing 410c may include term 418. Terms 414, 416, and 418 may be other terms within the context of the respective writing.

Referring back to FIG. 2, training component 212 may be configured to obtain vector generation model 210 that generates vectors. The generated vectors may be for individual instances of the terms in the set of writings that are part of a lexicography of the knowledge domain. The vectors may numerically represent the text of the terms and contexts of the instances of the terms. The contexts of the instances of the terms may include the other terms in the individual writings, syntactic relationship with the instances of the first term, location of the user, title of the user (e.g., physician's assistant, nurse, doctor, surgeon, etc.), user behavior of the user, and/or other contexts.

By way of non-limiting example, location of the user may indicate the user's accent and how the user pronounces terms. The user may have a title of surgeon and use certain terms often that a physical's assistant would not use often. The user may have a user behavior of using acronyms and/or abbreviations instead of using an entire term.

Training component 212 may be configured to use vector generation model 210 to generate the vectors. A first set of vectors may be generated that represent the instances of the first term (e.g., term 412 of FIG. 4B). The first set of vectors may numerically represent the text of the first term and different contexts of the individual instances of the first term. The first set of vectors may include a first vector that numerically represents the text of the first term and the context of a first instance of the first term.

Training component 212 may be configured to use vector generation model 210 to generate other vectors are that represent instances of the other terms of the set of writings (e.g., terms, 414, 416, and 418 of FIG. 4B). The other vectors may numerically represent the text of the individual other terms and different contexts of the individual instances of the individual other terms.

Referring to back to FIG. 2, training component 212 may be configured to train vector generation model 210 to group the vectors of a similar context in a space of a vector space. Training vector generation model 210 may cause the first vector and the other vectors, or some of the other vectors, to grouped in a first space of the vector space. The first space of the vector space may include the first set of vectors in addition to the first vector because the first set of vectors numerically represent the text of the first term and the different contexts (e.g., syntactic relationships) of the individual instances of the first term yet similar contexts (e.g., similar other terms in the writings).

Figure 4C:
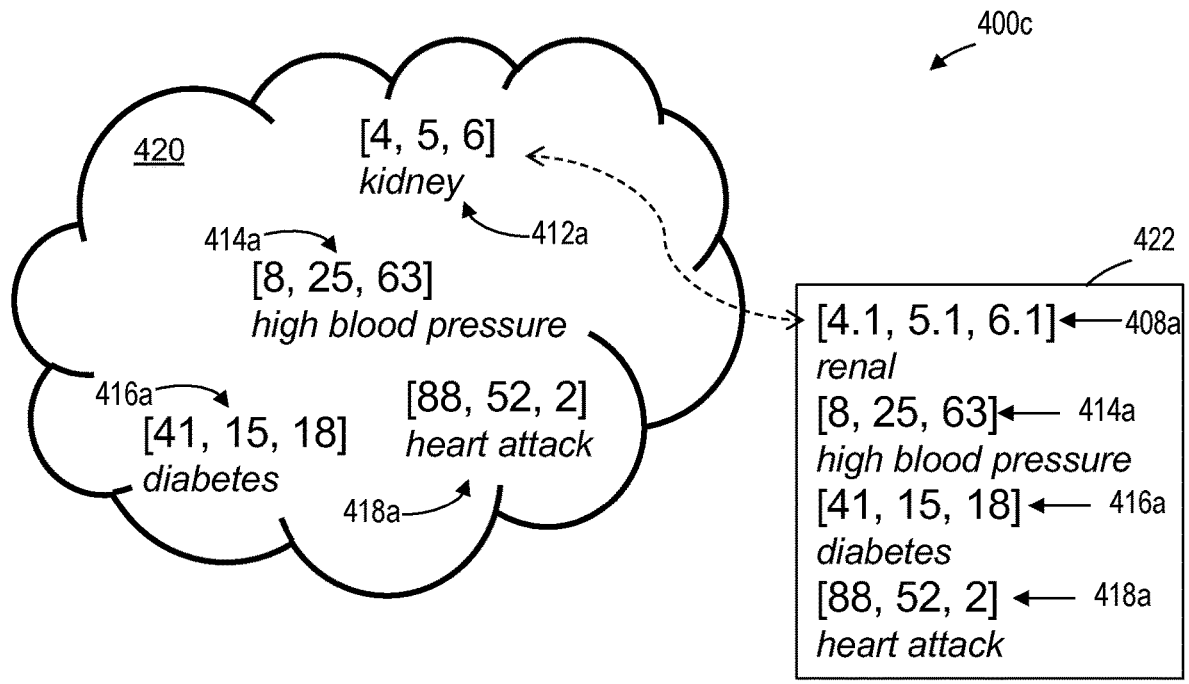
Figure 4D:
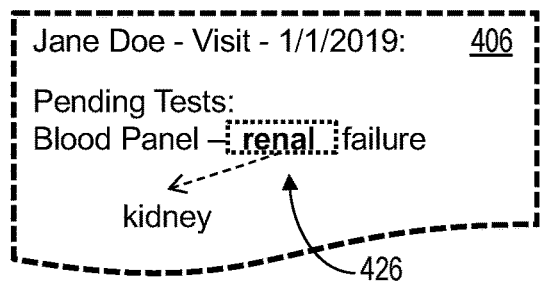

Referring to FIG. 4C, FIG. 4C may illustrate vector space 400c. Vector space 400c may include space 420. Vector 412a (i.e., the first vector) may represent an instance of term 412 in writings 410a-410c. Likewise, vector 414a may represent an instance of term 414 in writing 410a, vector 416a may represent an instance of term 416 in writing 410b, and vector 418a may represent an instance of term 418 in writing 410c (i.e., the other vectors). Because terms 414, 416, and 418 are present in contexts of writings that include term 412 (or several instance of term 412), vectors 412a, 414a, 416a, and 418a may be grouped in space 420. Such grouping may indicate that term 412-418 are of the same context (i.e., related to kidneys).

Training vector generation model 210 may include determining co-occurrence probability between the instances of the first term and the other terms that are part of the lexicography of the domain, determining mutual information between the instances of the first term and the other terms that are part of the lexicography of the domain, and/or other determinations that may train vector generation model 210 to group the vectors of the similar context in the first space of the vector space. The vectors of the similar context in the first space of the vector space may have been previously trained such that vectors representing the text of incorrectly transcribed terms are correlated to vectors representing the text of correctly transcribed terms and grouped in the first space.

Functions executed by the components of system 200 may occur prior to execution of system 100 such that system 200 trains the model prior to employment of the model. Upon training, the model may be stored to electronic storage 220. Upon any further training, the model may be re-stored and/or updated to electronic storage 220.

Referring back to FIG. 1, employ component 110 may be configured to employ the model trained by system 200 (i.e., the term grouping model). The trained model may generate, via system 200, a primary set of vectors (e.g., vector set 422 of FIG. 4C) that numerically represents the text of the transcribed terms of the transcript and context of the instances of the transcribed terms of the transcript. The primary set of vectors may include a primary vector (e.g., vector 408a of FIG. 4C) that numerically represents the text of the new transcribed term (e.g., term 408 of FIG. 4A) and context of the instance of the new transcribed term.

Referring back to FIG. 4C, vector set 422 may be generated based on the transcribed terms of transcript 406. Vector set 422 may include generated vector 408a, vector 414a, vector 416a, and vector 418a to represent terms "renal", "high blood pressure", "diabetes", and "heart attack", respectively, present in transcript 406.

Employ component 110 may be configured to obtain the first space in the vector space. The first space in the vector space may represent text of transcribed terms of the context of the instances of the transcribed terms of the transcript. The first space may have been generated by obtained vector generation model 210 and used by system 200. The first space may be obtained from the model trained by system 200. The first space may include the primary set of vectors except the primary vector and may include the first vector (e.g., vector 412a of example in FIG. 4C). The first vector may represent text of an alternative term of the context of the instances of the transcribed terms of the transcript. In other words, the text of the new transcribed term from the transcript (that is represented by the primary vector) may be interchanged with the text of the alternative term (that is represented by the first vector) and still maintain the same implication.

Referring back to FIG. 4C, the model may have obtained space 420. Evidently, vectors 414a, 416a, and 418a that represented terms present in transcript 406 are too present in space 420, but not vector 408a. Additionally, space 420 includes vector 412a.

Utilize component 112 may be configured to compare the primary set of vectors to the vectors of the first space. The primary set of vectors, except the primary vector, may be similar to or the same as the other vectors grouped into the first space of the vector space. As previously mentioned, the other vectors represent instances of other terms of the set of writings that are of the similar context as the first vector. Therefore, the comparison may determine the primary set of vectors correlate to the vectors of the first space and/or the primary vector correlates to the first vector based on determined similarities, equivalences, and/or other determined relationships between the vectors and/or first space. In other words, the comparison may determine grouping the primary set of vectors, including the primary vector, in the first space is reasonable. Such comparison indicates that the primary vector and the first vector correlate and are the same or have similar meaning, or both.

Referring back to FIG. 4C, upon comparison of vector set 422 with space 420, it is determined that the vectors of vector set 422 are present in space 420, except 408a. Upon comparison between vector 408a and 412a, it is determined that the intent of the terms vector 408a ("renal) and 412a ("kidney") represent are the same or similar.

As previously mentioned, the first space in the vector space that represents the text of terms of the context of the instances of the transcribed terms of the transcript may result from training the model by system 200 (i.e., the term grouping model) to group vectors of the similar context.

As previously mentioned, training the model by system 200 to group the vectors of the similar context includes obtaining a set of writings within the particular knowledge domain. The individual writings including terms. The terms may include transcribed terms automatically derived from audio dictations representing various speech from the user and/or published terms of literatures of the particular knowledge domain. The transcribed terms may result from automatic speech recognition as textual representations of spoken terms in the audio dictations. The terms may include instances of the alternative term that is represented by the first vector.

Utilize component 112 may be configured to store the correlation between the primary vector and the first vector and/or the correlation between the primary set of vectors and the vectors of the first space. The correlations may be stored to electronic storage 118. Such stored correlation may direct future instances of the new transcribed term to the first space and/or the first vector to determine the intent of the new transcribed term.

Utilize component 112 may be configured to utilize the text of the alternative term (e.g., term 412, "kidney", of FIG. 4B) in the instance of the new transcribed term (e.g., term 408, "renal", in FIG. 4A). The utilization may be based on the comparison of the primary set of vectors and the vectors of the first space that determined the primary vector correlates to the first vector. Thus, utilizing the text of the alternative term, that is represented by the first vector, instead of the instance of the new transcribed term maintains intent of the new transcribed term and does not change the implication of the transcript.

Utilizing the text of the alternative term (e.g., term 412 of FIG. 4B) in the instance of the new transcribed term (e.g., term 408, "renal", in FIG. 4A) may include implementing the new transcribed term, the alternative term, or some other term that represents a syntactical meaning shared by the new transcribed term and the alternative term to infer intent of the user (e.g., author or speaker) of the new transcribed term. This may include substituting the text of the new transcribed term and/or of the other term that represents the shared syntactical meaning in text to be presented to the user or other users, in a command executed by system 100, and/or in other contexts. Utilizing the text of the alternative term (or the meaning thereof) may enhance accuracy and/or precision of system 100 in inferring intent of the user of the new transcribed term. Such enhanced accuracy and/or precision may enhance operation of system 100 in taking any number of actions based on the transcription and/or other textual content in which the new transcribed term appears. In some implementations, the substitution of the new transcribed term for the alternative term by utilize component 112 may be internal to system 100. That is, utilize component 112 may make a substitution or co-use of the new transcribed term for or with the alternative term in a way that is not conveyed to any user (e.g., a substitution is not conveyed through any user interface, but instead the new transcribed term is left in the text presented). In some implementations, utilize component 112 may cause transmission of the correlation between the primary vector and the first vector and/or the correlation between the set of primary vectors and the first space to another system.

Utilizing the text of the alternative term (e.g., term 412 of FIG. 4B) in the instance of the new transcribed term (e.g., term 408, "renal", in FIG. 4A) may include replacing the instance of the new transcribed term (e.g., term 408, "renal", in FIG. 4A) with the text of the alternative term that is represented by the first vector (e.g., term 412, "kidney", of FIG. 4B) such that the transcript is updated. The replacement does not change the implication or intent of the transcript. The transcript, upon replacement, may be stored to electronic storage 118 such that users (e.g., other personnel) may access the transcript.

Concluding the example of FIG. 4A-D, FIG. 4D illustrates transcript 406 and correlation 426 between "renal" and "kidney" such that doctor 402 ordered a blood panel for kidney failure when doctor 402 dictated "renal failure" in audio 404, not changing the intent of the command present in audio 404.

In some implementations, server(s) 102, client computing platform(s) 104, and/or external resources 116 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 116 may be operatively linked via some other communication media.

A given client computing platform 104 may include one or more processors configured to execute computer program components. The computer program components may be configured to enable an expert or user associated with the given client computing platform 104 to interface with system 100 and/or external resources 116, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms. By interfacing with system 100, the one or more processors configured to execute the computer program modules of the given client computing platform 104 may improve functionality of the given client computing platform 104 such that the given client computing platform 104 functions more than a generic client computing platform thereon out. Upon interfacing with system 100, a computer-automated process may be established and/or improved of the given client computing platform 104.

External resources 116 may include sources of information outside of system 100, external entities participating with system 100, and/or other resources. In some implementations, some or all of the functionality attributed herein to external resources 116 may be provided by resources included in system 100.

Server(s) 102 may include electronic storage 118, one or more processors 120, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise non-transitory storage media that electronically stores information. The electronic storage media of electronic storage 118 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platform(s) 104, and/or other information that enables server(s) 102 to function as described herein.

Processor(s) 120 may be configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. These mechanisms for electronically processing information that may serve as processor(s) 120 may transforms and/or improve server(s) 102 such that server(s) 102 function to accomplish a specific purpose. Although processor(s) 120 is shown in FIG. 1 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. Processor(s) 120 may be configured to execute components 108, 110, and/or 112, and/or other components. Processor(s) 120 may be configured to execute components 108, 110, and/or 112, and/or other components by software; hardware; firmware; some combination of software, hardware, and/or firmware; and/or other mechanisms for configuring processing capabilities on processor(s) 120. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 120 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 120 may be configured to execute one or more additional components that may perform some or all of the functionality attributed below to one of components 108, 110, and/or 112.

Server(s) 202 may include electronic storage 218, one or more processors 220, and/or other components. Server(s) 202 may include communication lines, or ports to enable the exchange of information with a network and/or other computing platforms. Illustration of server(s) 202 in FIG. 2 is not intended to be limiting. Server(s) 202 may include a plurality of hardware, software, and/or firmware components operating together to provide the functionality attributed herein to server(s) 202. For example, server(s) 202 may be implemented by a cloud of computing platforms operating together as server(s) 202.

Electronic storage 218 may comprise non-transitory storage media that electronically stores information. The electronic storage media of electronic storage 218 may include one or both of system storage that is provided integrally (i.e., substantially non-removable) with server(s) 202 and/or removable storage that is removably connectable to server(s) 202 via, for example, a port (e.g., a USB port, a firewire port, etc.) or a drive (e.g., a disk drive, etc.). Electronic storage 218 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 218 may include one or more virtual storage resources (e.g., cloud storage, a virtual private network, and/or other virtual storage resources). Electronic storage 218 may store software algorithms, information determined by processor(s) 220, information received from server(s) 202, and/or other information that enables server(s) 202 to function as described herein.

Processor(s) 220 may be configured to provide information processing capabilities in server(s) 202. As such, processor(s) 220 may include one or more of a digital processor, an analog processor, a digital circuit designed to process information, an analog circuit designed to process information, a state machine, and/or other mechanisms for electronically processing information. Although processor(s) 220 is shown in FIG. 2 as a single entity, this is for illustrative purposes only. In some implementations, processor(s) 220 may include a plurality of processing units. These processing units may be physically located within the same device, or processor(s) 220 may represent processing functionality of a plurality of devices operating in coordination. Processor(s) 220 may be configured to execute components 208, 210, and/or 212, and/or other components. Processor(s) 220 may be configured to execute components 208, 210, and/or 212, and/or other components by software; hardware; firmware; some combination of software, hardware, and/or firmware; and/or other mechanisms for configuring processing capabilities on processor(s) 220. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 208, 210, and/or 212 are illustrated in FIG. 2 as being implemented within a single processing unit, in implementations in which processor(s) 220 includes multiple processing units, one or more of components 208, 210, and/or 212 may be implemented remotely from the other components. The description of the functionality provided by the different components 208, 210, and/or 212 described below is for illustrative purposes, and is not intended to be limiting, as any of components 208, 210, and/or 212 may provide more or less functionality than is described. For example, one or more of components 208, 210, and/or 212 may be eliminated, and some or all of its functionality may be provided by other ones of components 208, 210, and/or 212. As another example, processor(s) 220 may be configured to execute one or more additional components that may perform some or all of the functionality attributed below to one of components 208, 210, and/or 212.

Figure 3:
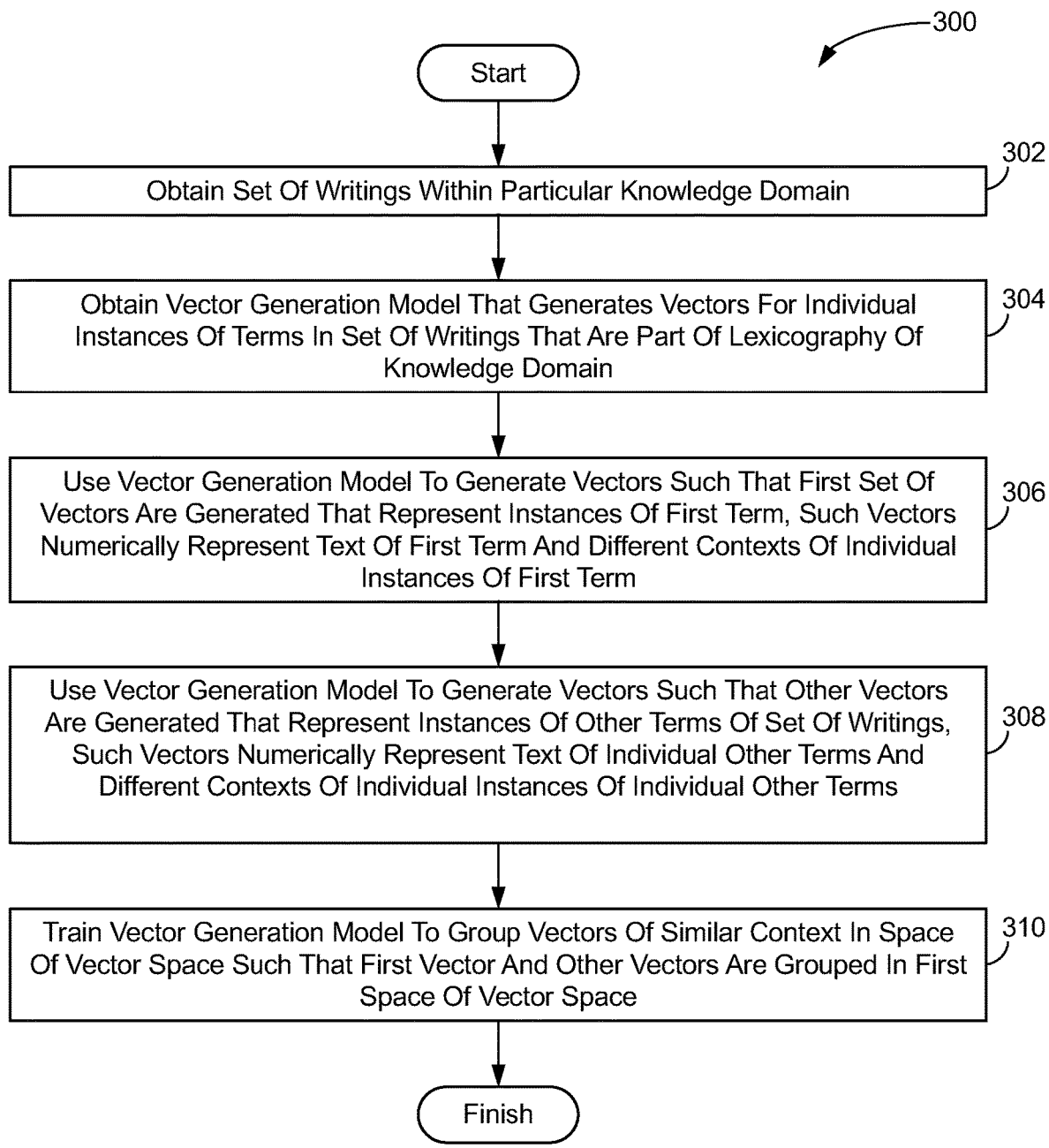
FIG. 3 illustrates a method to group terms based on context, in accordance with one or more implementations.

FIG. 3 illustrates a method 300 to group terms based on context, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include obtaining a set of writings within a particular knowledge domain. The individual writings may include terms. The terms may include transcribed terms and/or published terms of literatures of the particular knowledge domain. The terms may include instances of the first term that is part of a lexicography of the knowledge domain. Operation 302 may be performed by one or more hardware processors configured by machine-readable instructions including a component that is the same as or similar to obtaining component 208, in accordance with one or more implementations.

An operation 304 may include obtaining a vector generation model that generates vectors for individual instances of the terms in the set of writings that are part of a lexicography of the knowledge domain. The vectors may numerically represent the text of the terms and contexts of the instances of the terms. Operation 304 may be performed by one or more hardware processors configured by machine-readable instructions including a component that is the same as or similar to training component 212 and vector generation model 210, in accordance with one or more implementations.

An operation 306 may include using the vector generation model to generate a first set of vectors that represent the instances of the first term. The first set of vectors may include the first vector that numerically represents the text of the first term and the context of a first instance of the first term. Operation 306 may be performed by one or more hardware processors configured by machine-readable instructions including a component that is the same as or similar to training component 212, in accordance with one or more implementations.

An operation 308 may include using the vector generation model to generate other vectors that represent instances of the other terms of the set of writings. Such vectors numerically representing the text of the individual other terms and different contexts of the individual instances of the individual other terms. Operation 308 may be performed by one or more hardware processors configured by machine-readable instructions including a component that is the same as or similar to training component 212, in accordance with one or more implementations.

An operation 310 may include training the vector generation model to group the vectors of a similar context in a space of a vector space. The training may cause the first vector and the other vectors to group in the first space of the vector space. Operation 310 may be performed by one or more hardware processors configured by machine-readable instructions including a component that is the same as or similar to training component 212, in accordance with one or more implementations.

Figure 5:
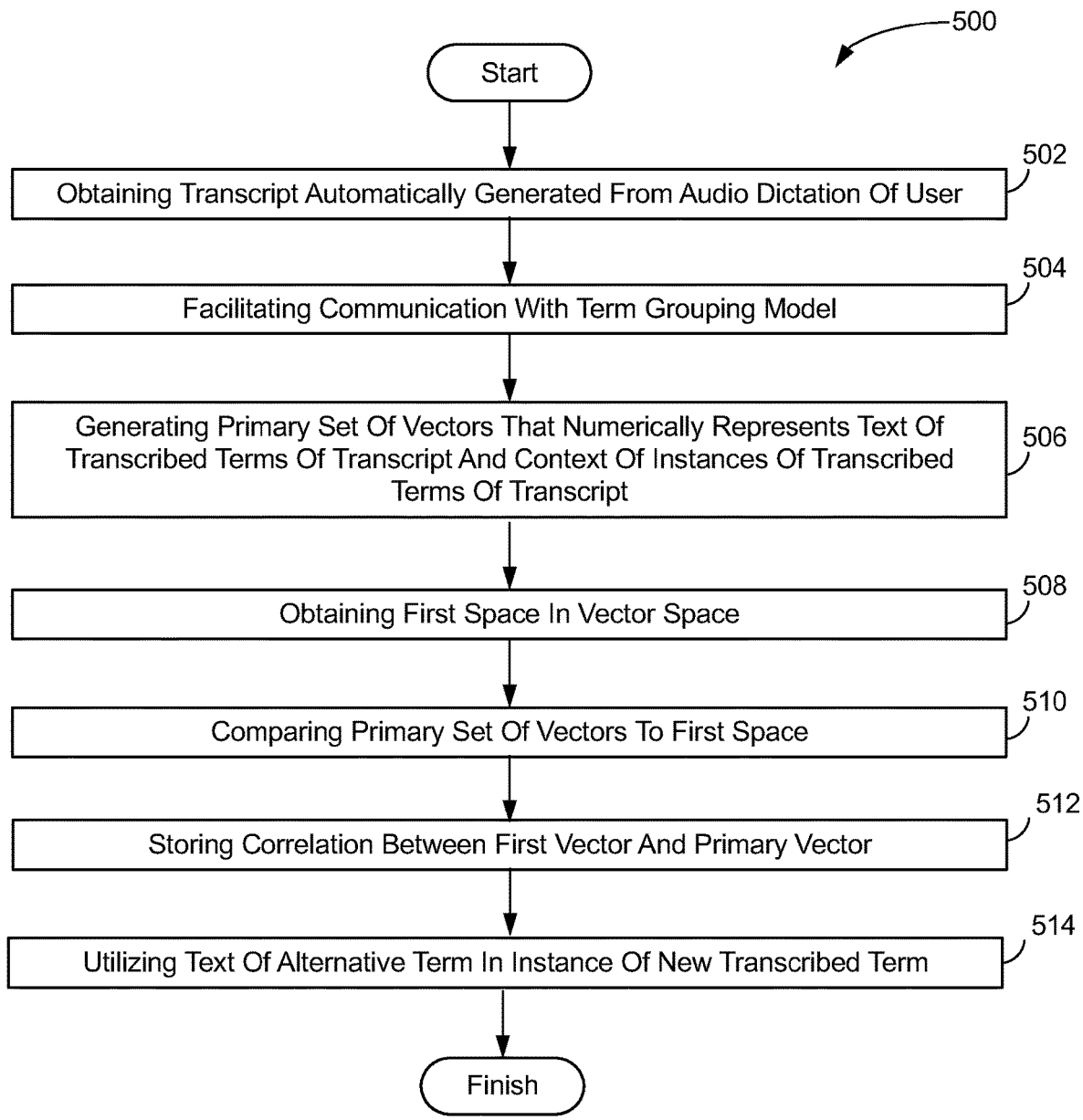
FIG. 5 illustrates a method to utilize a term grouping model to determine intent of a command with a new spoken term, in accordance with one or more implementations.

FIG. 5 illustrates a method 500 to utilize a term grouping model to determine intent of a command with a new spoken term, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

An operation 502 may include obtaining the transcript automatically generated from audio dictation of the user. The transcript including the instances of the transcribed terms automatically derived from the audio dictation as textual representations of spoken terms in the audio dictation. The transcribed terms may include the instance of the new transcribed term. Operation 502 may be performed by one or more hardware processors configured by machine-readable instructions including a component that is the same as or similar to obtaining component 108, in accordance with one or more implementations.

An operation 504 may include facilitating communication with the term grouping model (i.e., the model trained by system 200). Operation 504 may be performed by one or more hardware processors configured by machine-readable instructions including a component that is the same as or similar obtaining component 108 and system 200, in accordance with one or more implementations.

An operation 506 may include generating the primary set of vectors that numerically represents the text of the transcribed terms of the transcript and context of the instances of the transcribed terms of the transcript. The primary set of vectors including the primary vector that numerically represents the text of the new transcribed term and context of the instance of the new transcribed term. Operation 506 may be performed by one or more hardware processors configured by machine-readable instructions including a component that is the same as or similar to employ component 110, in accordance with one or more implementations.

An operation 508 may include obtaining the first space in the vector space. The first space may represent text of transcribed terms of the context of the instances of the transcribed terms of the transcript. The first space may include the primary set of vectors except the primary vector and including the first vector that represents text of the alternative term of the context of the instances of the transcribed terms of the transcript. Operation 508 may be performed by one or more hardware processors configured by machine-readable instructions including a component that is the same as or similar to employ component 110, in accordance with one or more implementations.

An operation 510 may include comparing the primary set of the vectors to the first space. Such comparison may determine the primary vector correlates to the first space such that the primary vector and the first vector are equivalent. Operation 510 may be performed by one or more hardware processors configured by machine-readable instructions including a component that is the same as or similar to utilize component 112, in accordance with one or more implementations.

An operation 512 may include storing the correlation between the first vector and the primary vector. Operation 512 may be performed by one or more hardware processors configured by machine-readable instructions including a component that is the same as or similar to utilize component 112, in accordance with one or more implementations.

An operation 514 may include utilizing the text of the alternative term in the instance of the new transcribed term. Such utilization may be based on the comparison. Operation 514 may be performed by one or more hardware processors configured by machine-readable instructions including a component that is the same as or similar to utilize component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to group terms based on context, the system comprising:
one or more processors configured by machine-readable instructions to:
obtain a set of writings within a particular knowledge domain, wherein individual ones of the writings within the set of writings include terms, wherein the terms include (i) transcribed terms that are textual representations of spoken terms in audio dictations, and/or (ii) published terms of literatures of the particular knowledge domain, wherein the audio dictations represent various speech from a user, and wherein the transcribed terms are automatically derived from automatic speech recognition of the audio dictations, wherein the terms are part of a lexicon of the particular knowledge domain, the terms including individual instances of a first term;
obtain a vector generation model that generates vectors for instances of individual ones of the terms that are included in the set of writings and that are part of the lexicon of the particular knowledge domain, the vectors numerically representing text of the individual terms and contexts of the instances of the individual terms;
use the vector generation model to generate the vectors, wherein the terms include individual instances of other terms that are not the first term, such that:
a first set of vectors are generated that represent the individual instances of the first term, wherein individual vectors in the first set numerically represent (i) the text of the first term, and (ii) individual contexts that the individual instances of the first term are used in, the first set of vectors including a first vector that numerically represents the text of the first term and a first context of a first instance that the first term is used in, wherein the instances of the first term include the first instance, and
other vectors are generated that represent the individual instances of the other terms that are a part of the lexicon of the knowledge domain and included in the set of writings, such vectors numerically representing text of individual ones of the other terms and contexts that the individual instances of the individual other terms are used in, wherein the vectors include the first set and the other vectors; and
train the vector generation model to group the vectors into spaces of a vector space based on similar contexts that the individual vectors were generated based on, such that the first vector and some of the other vectors are grouped into a first space of the vector space.

2. The system of claim 1, wherein the terms include words and/or phrases.

3. The system of claim 1, wherein the set of writings include transcripts of notes of the user, books, articles, theses, and/or transcribed lectures.

4. The system of claim 1, wherein the contexts of the instances of the individual terms involve the other terms and/or syntactic relationships with the instances of the first term.

5. The system of claim 1, wherein training the vector generation model includes determining co-occurrence probability between the instances of the first term and the other terms that are part of the lexicon of the domain.

6. The system of claim 1, wherein training the vector generation model includes determining mutual information between the instances of the first term and the other terms that are part of the lexicon of the domain.

7. The system of claim 1, wherein the contexts of the instances of the individual terms includes location of the user, title of the user, and/or user behavior of the user.

8. A system configured to utilize a term grouping model to determine intent of a command with a new spoken term, the system comprising:
one or more processors configured by machine-readable instructions to:
obtain a transcript automatically generated from audio dictation of a user, wherein the transcript resulted from automatic speech recognition, the transcript including instances of transcribed terms automatically derived from the audio dictation as textual representations of spoken terms in the audio dictation, the transcribed terms including an instance of a new transcribed term;
facilitate communication with the term grouping model, the term grouping model configured to group terms based on a particular context;
generate, via the term grouping model, a set of vectors that numerically represent text of the transcribed terms included in the transcript and contexts of the instances of the transcribed terms in the transcript, the set of vectors including a first vector that numerically represents text of the new transcribed term and context of the instance of the new transcribed term;
obtain, from the term grouping model, a first space, wherein the first space is included in a vector space, wherein the first space represents text of transcribed terms that are in the contexts of the instances, the first space including the set of vectors except the first vector and including a second vector that represents text of an alternative term to the new transcribed term in the contexts of the instances of the transcribed terms included in the transcript;
compare the set of the vectors to the first space to determine whether the first vector is related to the first space and whether the first vector correlates to one of the vectors in the first space, such that the first vector is determined to be related to the first space and a correlation between the first vector and the second vector is determined, wherein the correlation indicates equivalency;
store the correlation between the first vector and the second vector; and
utilize, based on the correlation, the text of the alternative term by replacing the instance of the new transcribed term with the text of the alterative term.

9. The system of claim 8, wherein the first space is a result of training the term grouping model to group vectors that were generated based on a similar context.

10. The system of claim 9, wherein training the term grouping model to group the vectors of the similar context includes obtaining a set of writings within a particular knowledge domain, wherein individual ones of the writings within the set of writings include terms, the terms including (i) transcribed terms that are textual representations of spoken terms in audio dictations and/or, (ii) published terms of literatures of the particular knowledge domain, wherein the audio dictations represent various speech from users, and wherein the transcribed terms are automatically derived from automatic speech recognition, the terms including instances of the alternative term.

11. A method configured to group terms based on context, the method comprising:
obtaining a set of writings within a particular knowledge domain, wherein individual ones of the writings within the set of writings include terms, wherein the terms include (i) transcribed terms that are textual representations of spoken terms in audio dictations, and/or (ii) published terms of literatures of the particular knowledge domain, wherein the audio dictations represent various speech from a user, and wherein the transcribed terms are automatically derived from automatic speech recognition of the audio dictations, wherein the terms are part of a lexicon of the particular knowledge domain, the terms including individual instances of a first term;
obtaining a vector generation model that generates vectors for instances of individual ones of the terms that are included in the set of writings and that are part of the lexicon of the particular knowledge domain, the vectors numerically representing text of the individual terms and contexts of the instances of the individual terms;
using the vector generation model to generate the vectors, wherein the terms include individual instances of other terms that are not the first term, such that:
a first set of vectors are generated that represent the individual instances of the first term, wherein individual vectors in the first set numerically represent (i) the text of the first term, and (ii) individual contexts that the individual instances of the first term are used in, the first set of vectors including a first vector that numerically represents the text of the first term and a first context of a first instance that the first term is used in, wherein the instances of the first term include the first instance, and
other vectors are generated that represent the individual instances of the other terms that are a part of the lexicon of the knowledge domain and included in the set of writings, such vectors numerically representing text of individual ones of the other terms and contexts that the individual instances of the individual other terms are used in, wherein the vectors include the first set and the other vectors; and
training the vector generation model to group the vectors into spaces of a vector space based on similar contexts that the individual vectors were generated based on, such that the first vector and some of the other vectors are grouped into a first space of the vector space.

12. The method of claim 11, wherein the terms include words and/or phrases.

13. The method of claim 11, wherein the set of writings include transcripts of notes of the user, books, articles, theses, and/or transcribed lectures.

14. The method of claim 11, wherein the contexts of the instances of the individual terms involve the other terms and/or syntactic relationships with the instances of the first term.

15. The method of claim 11, wherein training the vector generation model includes determining co-occurrence probability between the instances of the first term and the other terms that are part of the lexicon of the domain.

16. The method of claim 11, wherein training the vector generation model includes determining mutual information between the instances of the first term and the other terms that are part of the lexicon of the domain.

17. The method of claim 11, wherein the contexts of the instances of the individual terms includes location of the user, title of the user, and/or user behavior of the user.

18. A method configured to utilize a term grouping model to determine intent of a command with a new spoken term, the method comprising:

obtaining a transcript automatically generated from audio dictation of a user, wherein the transcript resulted from automatic speech recognition, the transcript including instances of transcribed terms automatically derived from the audio dictation as textual representations of spoken terms in the audio dictation, the transcribed terms including an instance of a new transcribed term;

facilitating communication with the term grouping model, the term grouping model configured to group terms based on a particular context;

generating, via the term grouping model, a set of vectors that numerically represent text of the transcribed terms included in the transcript and contexts of the instances of the transcribed terms in the transcript, the set of vectors including a first vector that numerically represents text of the new transcribed term and context of the instance of the new transcribed term;

obtaining, from the term grouping model, a first space, wherein the first space is included in a vector space, wherein the first space represents text of transcribed terms that are in the contexts of the instances, the first space including the set of vectors except the first vector and including a second vector that represents text of an alternative term to the new transcribed term in the contexts of the instances of the transcribed terms included in the transcript;

comparing the set of the vectors to the first space to determine whether the first vector is related to the first space and whether the first vector correlates to one of the vectors in the first space, such that the first vector is determined to be related to the first space and a correlation between the first vector and the second vector is determined, wherein the correlation indicates equivalency;

storing the correlation between the first vector and the second vector; and utilizing, based on the correlation, the text of the alternative term by replacing the instance of the new transcribed term with the text of the alternative term.

19. The method of claim 18, wherein the first space is a result of training the term grouping model to group vectors that were generated based on a similar context.

20. The method of claim 19, wherein training the term grouping model to group the vectors of the similar context includes obtaining a set of writings within a particular knowledge domain, wherein individual ones of the writings within the set of writings include terms, the terms including (i) transcribed terms that are textual representations of spoken terms in audio dictations and/or, (ii) published terms of literatures of the particular knowledge domain, wherein the audio dictations represent various speech from users, and wherein the transcribed terms are automatically derived from automatic speech recognition, the terms including instances of the alternative term.

* * * * *

UNITED STATES PATENT AND TRADEMARK OFFICE
CERTIFICATE OF CORRECTION

| | |
|---|---|
| PATENT NO. | : 11,538,465 B1 |
| APPLICATION NO. | : 16/678453 |
| DATED | : December 27, 2022 |
| INVENTOR(S) | : Ahmad Badary |

It is certified that error appears in the above-identified patent and that said Letters Patent is hereby corrected as shown below:

In the Claims

In Claim 8, Column 15, Line 52, please delete "alterative", insert --alternative--, therefor.

Signed and Sealed this
Fourteenth Day of March, 2023

Katherine Kelly Vidal
*Director of the United States Patent and Trademark Office*